R. MARLOW.
GEAR WHEEL.
APPLICATION FILED AUG. 10, 1920.

1,394,751.

Patented Oct. 25, 1921.

Inventor

R. MARLOW

By W. J. Fitz Gerald & Co.

Attorney

UNITED STATES PATENT OFFICE.

RICHARD MARLOW, OF RALPH, ALABAMA.

GEAR-WHEEL.

1,394,751.  Specification of Letters Patent.  Patented Oct. 25, 1921.

Application filed August 10, 1920. Serial No. 402,659.

*To all whom it may concern:*

Be it known that I, RICHARD MARLOW, a citizen of the United States, residing at Ralph, in the county of Tuscaloosa and State of Alabama, have invented certain new and useful Improvements in Gear-Wheels; and I do hereby declare the following to be a full, clear, and exact description of the invention, such as will enable others skilled in the art to which it appertains to make and use the same.

The present invention relates to gear wheels, and has for its object the provision of a gear or sprocket wheel of novel and improved construction, whose teeth or cogs can be removed and replaced by new ones, when worn out or broken.

A further object is the provision of a gear or sprocket wheel having a band embracing the body of the wheel and holding individual teeth or cogs, whereby they can be removed and replaced by driving the band from the body.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1:
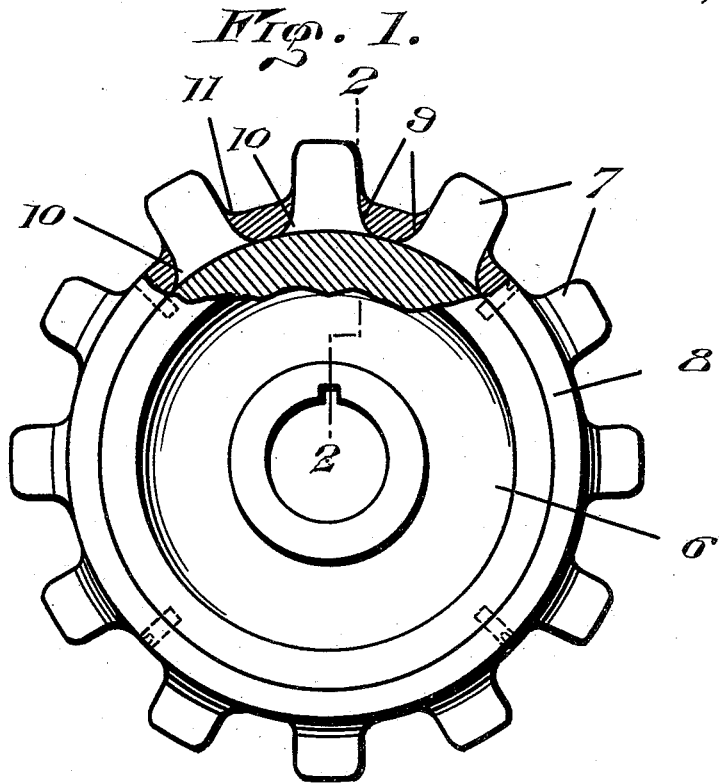
Figure 1 is a side elevation of the gear wheel embodying the present improvements, portions being shown in section.
Figure 2:
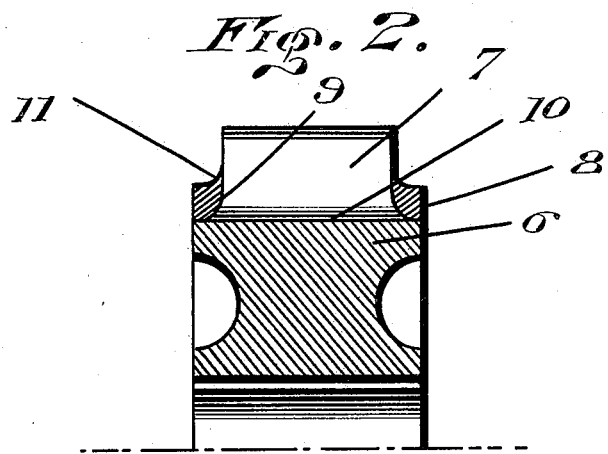
Fig. 2 is a section on the line 2—2 of Fig. 1.

The present improvements can be used in both gear and sprocket wheels, and the wheel, as shown, comprises the body 6 from which the teeth or cogs 7 project radially such teeth being separate parts having their bases abutting the periphery of the body.

The teeth are retained in place by means of a band or ring 8 tightly embracing the body, and having openings 9 through which the teeth project outwardly, the bases of the teeth and openings of pyramidal form to securely anchor the teeth within the band, and the edges of the band around the openings are preferably curved outwardly to bear against the teeth and brace them. The enlarged base ends of the teeth are therefore securely anchored within the band in abutment with the body, to give the teeth the needed strengh.

Should one or more teeth become broken or worn out, the band 8 can be driven off of the body 6, and the teeth pushed inwardly out of the openings 9, enabling new teeth to be inserted outwardly into said openings, after which the band can be again driven onto the body 6.

The present wheel is therefore economical, inasmuch as the teeth or cogs can be renewed when worn out or broken, instead of discarding the entire wheel, as usual.

Having thus described the invention, what is claimed as new is:—

1. A gear wheel having a body, a band embracing same, and teeth anchored in the band and held in place by the body and removable inwardly from the band when the band is removed from the body.

2. A gear wheel having a body, a band embracing same, and teeth anchored in the band and abutting the body, the teeth being removable inwardly from the band when it is removed from the body.

3. A gear wheel having a body, a band embracing same having openings, and teeth inserted outwardly in said openings and abutting the body.

4. A gear wheel having a body, a band embracing same having openings, and teeth inserted outwardly in said openings and having enlarged bases anchored in the band and abutting the body.

In testimony whereof I have signed my name to this specification in the presence of two subscribing witnesses.

RICHARD MARLOW.

Witnesses:
 L. W. CORK,
 H. M. MARLOW.